US006912599B2

(12) United States Patent
Sicola et al.

(10) Patent No.: US 6,912,599 B2
(45) Date of Patent: Jun. 28, 2005

(54) METHOD AND APPARATUS FOR SENSING POSITIONS OF DEVICE ENCLOSURES WITHIN MULTI-SHELF CABINETS

(75) Inventors: Stephen J. Sicola, Palmer Lake, CO (US); Bruce A. Sardeson, Colorado Springs, CO (US); Dennis Spicher, Monument, CO (US); Richard Bruce Roberts, Colorado Springs, CO (US); Bill Pagano, Colorado Springs, CO (US); William K. Miller, Colorado Springs, CO (US); Clay T. Wade, Monument, CO (US); Mark Shepp, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 10/038,231

(22) Filed: Oct. 19, 2001

(65) Prior Publication Data

US 2003/0079062 A1 Apr. 24, 2003

(51) Int. Cl.[7] .................................. G06F 3/00
(52) U.S. Cl. ................... 710/8; 710/9; 710/15; 709/325; 312/223.1; 312/223.2; 312/223.3; 312/223.4; 312/223.5; 312/223.6; 361/679; 361/680; 361/681; 361/682; 361/683; 361/684; 361/685
(58) Field of Search .................. 710/8, 9, 15; 709/325; 312/223.1–223.6; 361/679–686

(56) References Cited

U.S. PATENT DOCUMENTS

| 5,109,318 A | 4/1992 | Funari et al. |
| 5,184,281 A | 2/1993 | Samarov et al. |
| 5,513,314 A | 4/1996 | Kandasamy et al. |
| 5,790,782 A | * 8/1998 | Martinez et al. .............. 714/53 |
| 5,815,371 A | 9/1998 | Jeffries et al. |
| 5,815,649 A | 9/1998 | Utter et al. |
| 5,822,777 A | 10/1998 | Leshem et al. |
| 5,832,222 A | 11/1998 | Dziadosz et al. |
| 5,835,700 A | 11/1998 | Carbonneau et al. ..... 395/183.2 |
| 5,838,891 A | * 11/1998 | Mizuno et al. ................ 714/5 |
| 5,892,973 A | * 4/1999 | Martinez et al. .............. 710/15 |
| 5,901,151 A | * 5/1999 | Bleiweiss et al. ........... 370/480 |
| 5,956,665 A | * 9/1999 | Martinez et al. ............ 702/188 |
| 5,987,622 A | 11/1999 | Lo Verso et al. |

(Continued)

OTHER PUBLICATIONS

Smart Storage Inc., "SmartStor InfiNet™: Virtual Storage for Today's E–economy," Sep. 2000.
Compaq Computer Corporation, "The Compaq Enterprise Network Storage Architecture: An Overview," May 2000.
Compaq Computer Corporation, "Compaq Storage Works" Data Replication Manager HSG80 ACS V8.5P Operations Guide, Mar. 2000.

*Primary Examiner*—Jeffrey Gaffin
*Assistant Examiner*—Niketa I. Patel

(57) ABSTRACT

A mass storage cabinet having passive device position sensing and including shelves for racking device enclosures. A cabinet bus is linked to the shelves and adapted to provide a unique shelf identifier signal to each of the shelves. The cabinet includes a device providing a cabinet identifier to the shelves. The cabinet bus includes junction boxes having first and second sets of sensing wires and a side connectors linked to the shelves for providing the shelf identifier signal from the first and second sets of sensing wires. To provide a different signal at each junction box, the sensing wires in the first set are moved one position and the sensing wires in the second set are moved one position prior to the connection to an adjacent junction box. An additional sensing wire is linked to the side connectors and grounded and ungrounded at each side connector to alter the signal.

21 Claims, 5 Drawing Sheets

U.S. PATENT DOCUMENTS

| | | |
|---|---|---|
| 5,996,089 A | 11/1999 | Mann et al. |
| 6,038,689 A | 3/2000 | Schmidt et al. |
| 6,073,209 A | 6/2000 | Bergsten |
| 6,148,414 A | 11/2000 | Brown et al. |
| 6,188,973 B1 | 2/2001 | Martinez et al. ............ 702/188 |
| 6,237,112 B1 | 5/2001 | Yoo et al. .................... 714/30 |
| 6,243,790 B1 | 6/2001 | Yorimitsu ................... 711/112 |
| 6,260,120 B1 | 7/2001 | Blumenau et al. |
| 6,266,721 B1 | 7/2001 | Sheikh et al. ............... 710/100 |
| 6,278,609 B1 | 8/2001 | Suzuki et al. |
| 6,282,094 B1 | 8/2001 | Lo et al. |
| 6,282,096 B1 | 8/2001 | Lo et al. |
| 6,282,610 B1 | 8/2001 | Bergsten |

* cited by examiner

| SHELF ID | BITS 7..4 | BITS 3..1 | BIT 0 |
|---|---|---|---|
| 1 | 1110 | 110 | 0 |
| 2 | 1110 | 110 | 1 |
| 3 | 1101 | 101 | 0 |
| 4 | 1101 | 101 | 1 |
| 5 | 1011 | 011 | 0 |
| 6 | 1011 | 011 | 1 |
| 7 | 0111 | 110 | 0 |
| 8 | 0111 | 110 | 1 |
| 9 | 1110 | 101 | 0 |
| 10 | 1110 | 101 | 1 |
| 11 | 1101 | 011 | 0 |
| 12 | 1101 | 011 | 1 |
| 13 | 1011 | 110 | 0 |
| 14 | 1011 | 110 | 1 |
| 15 | 0111 | 101 | 0 |
| 16 | 0111 | 101 | 1 |
| 17 | 1110 | 011 | 0 |
| 18 | 1110 | 011 | 1 |
| 19 | 1101 | 110 | 0 |
| 20 | 1101 | 110 | 1 |
| 21 | 1011 | 101 | 0 |
| 22 | 1011 | 101 | 1 |
| 23 | 0111 | 011 | 0 |
| 24 | 0111 | 011 | 1 |
| CABINET CABLE DISCONNECTED | 1111 | XXX | X |
| CABINET CABLE DISCONNECTED | XXXX | 111 | X |

FIG.4

| SHELF ID | BITS 7-4 | BITS 3-1 | BIT 0 |
|---|---|---|---|
| 1 | 0100 | 010 | 0 |
| 2 | 0100 | 010 | 1 |
| 3 | 0010 | 001 | 0 |
| 4 | 0010 | 001 | 1 |
| 5 | 0001 | 100 | 0 |
| 6 | 0001 | 100 | 1 |
| 7 | 1000 | 010 | 0 |
| 8 | 1000 | 010 | 1 |
| 9 | 0100 | 001 | 0 |
| 10 | 0100 | 001 | 1 |
| 11 | 0010 | 100 | 0 |
| 12 | 0010 | 100 | 1 |
| 13 | 0001 | 010 | 0 |
| 14 | 0001 | 010 | 1 |
| 15 | 1000 | 001 | 0 |
| 16 | 1000 | 001 | 1 |
| 17 | 0100 | 100 | 0 |
| 18 | 0100 | 100 | 1 |
| 19 | 0010 | 010 | 0 |
| 20 | 0010 | 010 | 1 |
| 21 | 0001 | 001 | 0 |
| 22 | 0001 | 001 | 1 |
| 23 | 1000 | 100 | 0 |
| 24 | 1000 | 100 | 1 |
| 25 | 1100 | 110 | 0 |
| 26 | 1100 | 110 | 1 |
| 27 | 0110 | 011 | 0 |
| 28 | 0110 | 011 | 1 |
| 29 | 0011 | 101 | 0 |
| 30 | 0011 | 101 | 1 |
| 31 | 1001 | 110 | 0 |
| 32 | 1001 | 110 | 1 |
| 33 | 1100 | 011 | 0 |
| 34 | 1100 | 011 | 1 |
| 35 | 0110 | 101 | 0 |
| 36 | 0110 | 101 | 1 |
| 37 | 0011 | 110 | 0 |
| 38 | 0011 | 110 | 1 |
| 39 | 1001 | 011 | 0 |
| 40 | 1001 | 011 | 1 |
| 41 | 1100 | 101 | 0 |
| 42 | 1100 | 101 | 1 |
| 43 | 0110 | 110 | 0 |
| 44 | 0110 | 110 | 1 |
| 45 | 0011 | 011 | 0 |
| 46 | 0011 | 011 | 1 |
| 47 | 1001 | 101 | 0 |
| 48 | 1001 | 101 | 1 |
| CABINET CABLE DISCONNECTED | 1111 | XXX | X |
| CABINET CABLE DISCONNECTED | XXXX | 111 | X |

FIG.5

METHOD AND APPARATUS FOR SENSING POSITIONS OF DEVICE ENCLOSURES WITHIN MULTI-SHELF CABINETS

BACKGROUND OF THE INVENTION

1. Field of the Invention

The present invention relates, in general, to computer systems and mass data storage systems and subsystems, and more particularly, to a position sensing system and method for use in automatically and passively determining physical locations of device or other enclosures within data storage system racks or cabinets having multiple shelves or enclosures.

2. Relevant Background

In the computer industry, there is ongoing and increasing demand for data storage systems with more capacity as well as improved reliability. The use of RAID (Redundant Arrays of Inexpensive Disks) systems has significantly enhanced data storage reliability by providing redundancy, i.e., failure of one system component does not cause loss of data or failure of the entire system. Although initially RAID systems generally provided redundant disk drives, more functional redundancy has recently been provided by extending redundancy to device enclosures. These enclosures may include a number of components such as power supplies, cooling modules, disk devices, temperature sensors, audible and/or visible alarms, and RAID and other controllers. To provide functional redundancy, the enclosure typically includes an extra one of each of these components that is needed for proper functionality. For example, two power supply units may be provided such that if one fails the remaining power supply unit is capable of providing adequate power.

A data storage system, e.g., an enterprise data center or complex, includes numerous multi-shelf cabinets or racks each holding multiple enclosures. The system is adapted for replacement of individual enclosures to upgrade or modify the system or in some cases, to service an enclosure. If an enclosure no longer has functional redundancy, e.g., one of its power supplies has failed, a system administrator will replace the entire enclosure or the failed power supply. To facilitate replacing or otherwise servicing enclosures, it is necessary to first identify the physical location and operating status of each enclosure within each cabinet and more specifically, to view the location and status of each enclosure on a monitor and/or graphical user interface (GUI).

Previously, the physical locations of components, such as enclosures, in data storage systems have been entered into databases used by monitoring software to display the location to the system administrator on the GUI. However, the manual entry process is susceptible to human error in initially entering the data and in updating the location information as the system is modified and grows in number of cabinets and enclosures in each cabinet. If the location is incorrect, the administrator most likely will remove and replace the wrong enclosure. Efforts to use analog sampling and polling have resulted in improved position detection within systems but have not been without problems due to noise, linking to fibre channel loop addressing, and added software monitoring complexity.

Hence, there remains a need for an improved method and apparatus for identifying the physical location of each enclosure in a data storage system. Preferably, such a system would support field replacement of individual enclosures, would not interfere or reduce data transfer or other functionality of the enclosures or included components, and would provide enclosure, shelf, and cabinet identification information for each enclosure within a system independent of its address on a fibre channel loop.

SUMMARY OF THE INVENTION

The present invention addresses the above discussed and additional problems by providing a cabinet for physically storing and communicatively linking computing devices. The cabinet includes shelves adapted for racking or holding device enclosures. Significantly, the cabinet includes a cabinet cable linked to each of the shelves that is adapted to provide a unique shelf identifier signal to each of the shelves. To allow an enclosure to be located within a data storage system having numerous cabinets, the cabinet includes a device, such as a cabinet environmental monitoring unit (EMU), for providing information identifying the cabinet to each of the shelves (such as a unique cabinet number). The cabinet cable is made up of a plurality of serially connected junction boxes each including a first set of sensing wires and a second set of sensing wires. A side connector is also included in the cable and linked to one of the shelves for providing the shelf identifier signal from the first and second sets of sensing wires.

To provide a different shelf identifier signal at each junction box, the junction boxes are wired such that each of the sensing wires in the first set are moved one position and each of the sensing wires in the second set are moved one position prior to the connection to an adjacent junction box. In this fashion, the physical location of the shelf within the cabinet is identified by its connection point along the cable. To allow each of the junction boxes to provide unique identifiers to two shelves, each junction box further includes an additional side connector linked to the first and second sets of sensing wires and an additional sensing wire that is linked to the side connectors. This additional sensing wire is alternately grounded and ungrounded at each side connector to alter the shelf identifier signal. In one embodiment, it has proven useful to have the first set of wires include 3 sensing wires and the second set of wires include 4 sensing wires to provide at least 24 of the unique shelf identifier signals within the cabinet cable and up to 48 in some situations.

In service, the cabinet typically includes a device enclosure on one of the shelves comprising a processor, such as an EMU, for processing the unique shelf identifier to determine a physical location within the cabinet. The processor generally then includes the determined physical location and the cabinet identification information in messages transmitted outside the enclosure to allow quick identification and mapping of every enclosure within a data storage system. The processor can determine the physical location by retrieving a shelf identifier from enclosure memory using the received shelf identifier signal. In one embodiment, the received shelf identifier signal is a 8-bit signal that is converted to a 4-bit shelf identifier by the processor for inclusion in messages along with the cabinet identification information.

BRIEF DESCRIPTION OF THE DRAWINGS

FIG. 4 is a table illustrating shelf identifiers obtained using an eight-wire arrangement in a cabinet bus with 3U shelf spacing; and FIG. 5 is a table similar to that of FIG. 4 illustrating shelf identifiers obtained in an alternative eight-wire arrangement in a cabinet bus to support 1U shelf spacing.

DETAILED DESCRIPTION OF THE PREFERRED EMBODIMENTS

The present invention is a system and method of determining or sensing the position of an enclosure or other device within a multi-shelf cabinet and within a storage complex utilizing a plurality of such cabinets or racks. The invention involves using a uniquely designed cabinet bus or cable in each cabinet that is linked to each enclosure, e.g., to the environmental monitor processor or unit (EMU). The cabinet cable is divided into two sensing portions that are used to provide position signals that give a unique identifier for each shelf location. The EMU is configured to receive and process the position signals from the sensing portions to define a physical location within a cabinet and the specific cabinet is determined from a cabinet identifier provided by another processor such as a cabinet EMU provided in each cabinet to facilitate intercabinet communications. In one embodiment, one sensing portion includes three wires and one portion includes four wires that when combined with a grounded wire provide an eight-bit shelf identifier that is arranged (with junction crossovers and other features explained below) to provide twenty-four unique shelf or cabinet position identifiers. The invention thus provides an electrically passive method of identifying the location of each enclosure on a shelf within a data storage complex, i.e., by shelf and cabinet identifiers. Thus, the invention provides a method and system that requires no active members (other than active components in enclosure EMUs as discussed below that can be replaced) in the cable or bus itself, thereby significantly enhancing system reliability.

Figure 1:
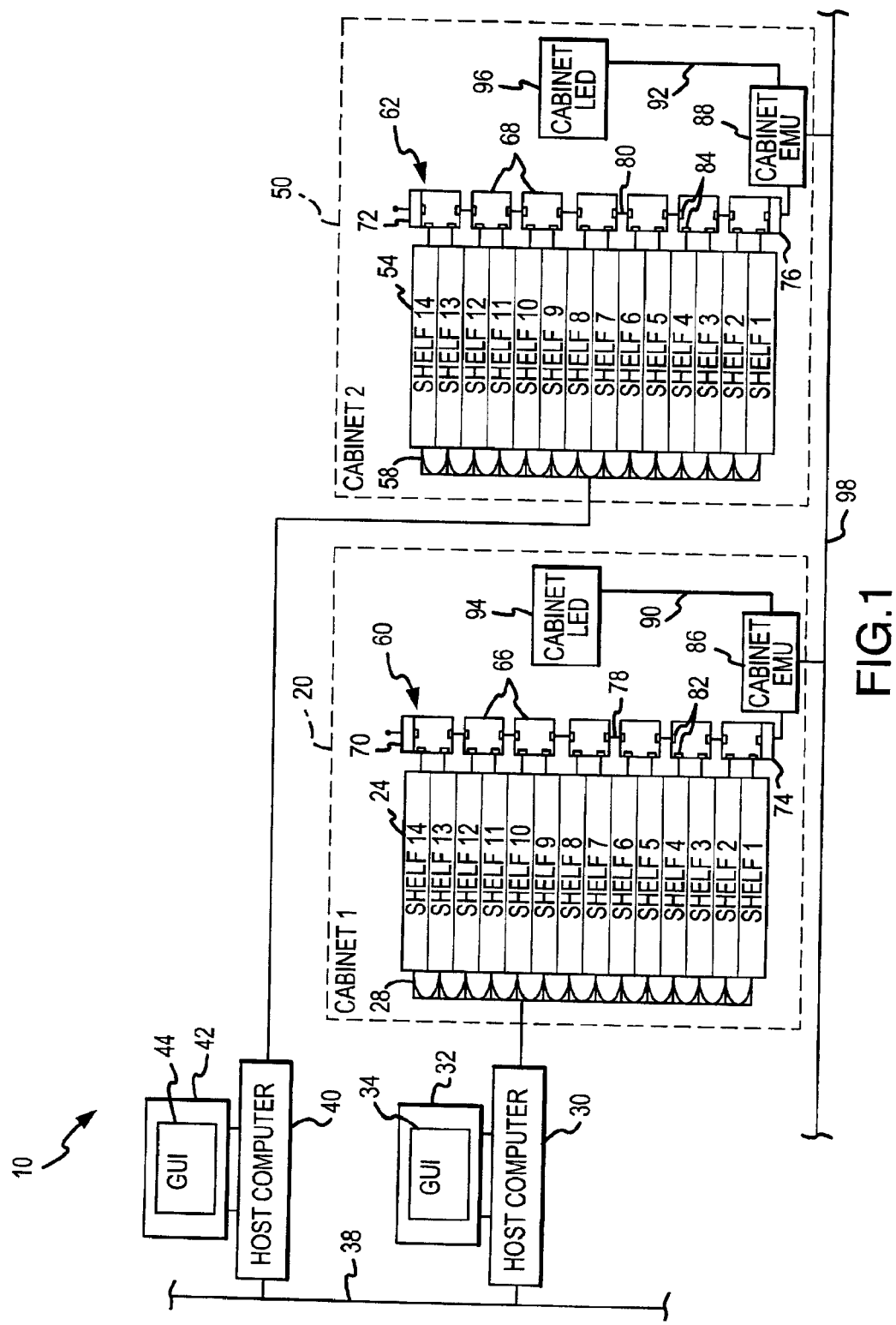
FIG. 1 is an illustration of a data storage system or complex with cabinets having multiple shelves incorporating a cabinet bus that provides, at least in part, the position detection techniques of the present invention.

FIG. 1 illustrates a data storage system 10 that provides components that function in combination to provide the enclosure position sensing features of the present invention. As shown, the data storage system 10 has a first and second cabinet 20, 50 (although typical systems 10 may have many more cabinets 20, 50) each having a plurality of shelves 24, 54. The shelves 24, 54 or shelf locations are configured to allow an enclosure (such as the device enclosure 100 of FIG. 2) or other components to be plugged into and supported within the cabinet 20, 50. Typical, cabinets 20, 50 configurations call for 14 shelves 24, 54 although more shelves may be provided such as up to 24 or more shelves 24, 54. If shelves 24, 54 are arranged vertically, a typical cabinet 20, 50 may have 24 shelves 24, 54 that each occupy a certain amount of rack space, such as 3 retma (U) which is a standard mounting unit increment.

Each shelf 24, 54 (and more particularly, the enclosure 100 at a shelf location 24, 54) is linked to a fibre channel loop 28, 58 that enables access by and data flow to a host computer 30, 40. The data that is passed typically includes SCSI-3 Enclosure Services (SES) data and commands sets and importantly, includes position information that identifies the shelf position and cabinet number or other identifier. The host computer 30, 40 may be a personal computer (PC), a server, or other computer or electronic device running software for allowing a user to access the position information (i.e., to receive the position information or signals from the fibre channel loops 28, 58 and display or otherwise provide enclosure position information to the user). In one embodiment, the host computer 30, 40 includes a monitor 32, 42 and provides enclosure position information on via a graphical user interface (GUI) 34, 44. The host computers 30, 40 are further linked to a communication network or bus, such as a company Ethernet, intranet, and the like, to allow information from enclosures on the shelves 24, 54 to be requested, retrieved, and transmitted to users at a location remote from the cabinets 20, 50.

Significantly, the cabinets 20, 50 include cabinet busses 60, 62 that are configured to passively provide electrical signals to enclosures on the shelves 24, 54 that uniquely identifies the position (typically vertical) within the cabinet 20, 50. The cabinet busses 60, 62 also provide an out-of-band (external to any fibre loop) communication path between the shelves 24, 54. The cabinet busses 60, 62 are divided into a number of junction boxes 66, 68. As shown, each junction box 66, 68 is linked to two shelves 24, 54. Each junction box 66, 68 includes four connectors, such as RJ-45 connectors, for connection to the shelves 24, 54 and adjacent junction boxes 66, 68 and/or terminators. The busses 60, 62 further include a top terminator 70, 72, and a bottom terminator 74, 76. The cabinet bus 60, 62 components are explained in more detail with reference to FIG. 3 that illustrates an exemplary wiring arrangement for a portion of the busses 60, 62.

In the illustrated embodiment, each cabinet 20, 50 includes a cabinet EMU 86, 88 that provides cabinet information such as a cabinet identifier, cabinet type, and the like that is passed via the cabinet bus 60, 62 to the shelves 24, 54 for use by an enclosure in sensing or determining position of the enclosure within the system 10. The cabinet EMUs 86, 88 are optional but when included, the bottom terminators 74, 76 are not required and are not included in the cabinet busses 60, 62, and the cabinet EMUs 86, 88 are adapted to provide the termination feature(s). In multi-cabinet systems 10, the cabinet EMU 86, 88 typically also acts as a firewall and router for SES information. In this regard, the cabinet EMU 86, 88 is linked to a communication link or network 98 (such as a private Ethernet) that allows the EMU 86, 88 to broadcast SES data for all shelves or groups of shelves 24, 54 to other cabinet EMUs 86, 88. The cabinet EMU 86, 88 filters the received SES data and forwarded to the corresponding enclosures on shelves 24, 54 by group (e.g., the received SES data is rebroadcast via the cabinet bus 60, 62). The cabinet EMU also transmits signals to the cabinet LED display (and audio alarm) 94, 96 for displaying status information for enclosures on the shelves 24, 54.

Figure 2:
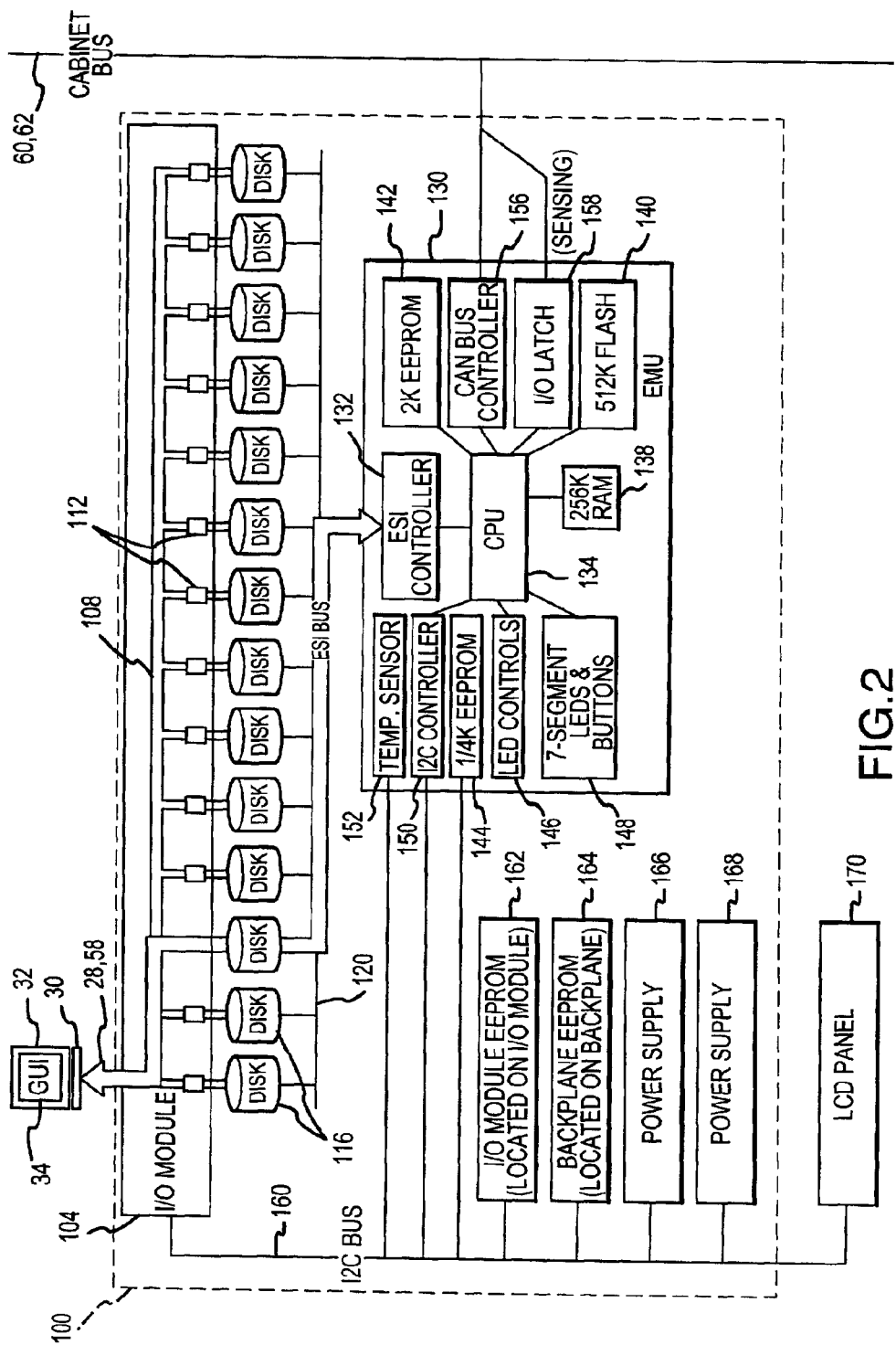
FIG. 2 is a simplified block diagram of an exemplary device enclosure that may be positioned on a shelf of the cabinets of FIG. 1 and for which a physical position can be sensed by the data storage system.

FIG. 2 illustrates an exemplary device enclosure 100 that according to the invention is configured to receive passive position signals from the cabinet bus 60, 62, process the signals including the cabinet identifier from the cabinet EMU 86, 88 (or another component), and transmit the enclosure position information in a signal to the host computer 30 (or 40). Note, the term shelf is often used for components within a cabinet 20, 50 such as an enclosure 100. In this application, shelf and shelf position is being used to identify a location, e.g., a vertical position, within a cabinet 20, 50 at which an enclosure 100 or other component(s) is connected or plugged in to the system 10.

The GUI host 30, 40 refers generally to any controller or host adapter capable of processing enclosure position signals and displaying (or otherwise reporting) the enclosure position to a user. The host typically will also be used to communicate SES data or pages via the fibre channel loop 28, 58 to and from the cabinets 20, 50. The highlighted path from the GUI host 30, 40 is used to show one exemplary path in the enclosure 100 for such SES data. The enclosure 100 is also linked directly to the cabinet bus 60, 62 to receive the cabinet identifier and shelf position information or identifier from the bus 60, 62 (as explained below).

The enclosure 100 includes an input/output (I/O) module 104 linked to the fibre channel loop 28, 58. The fibre channel loop 28, 58 is typically an arbitrated loop and although this diagram only shows one loop 28, 58 passing to (as shown by lines 108 with one data path through a disk drive 116 shown) the I/O module 104, the enclosure 100 may have two redundant loops with two I/O modules 104. The I/O module 104 acts as a communication interface to a plurality of disk devices or disk drives 116. Each I/O module 104 includes a bypass circuit 112 for each disk drive 116. The bypass circuit 112 can redirect the fibre loop 108 to include or exclude the disk drive 116 in the loop 108. If an EMU 130 is included in the enclosure 100, the EMU 130 can be used to control the bypass circuits 112 via the I2C bus 160 and I/O module 104. If no EMU 130 is present, the I/O modules can be configured to control the bypass circuits 112.

A number of standard disk devices may be utilized for the disk drives 116 to practice the invention. For example, in one embodiment, the disk drives 116 are selected to conform to the "Enclosure Initiated ESI" option described in the "SFF Committee, SFF-8067 Specification for 40-pin SCA-2 Connector w/Bi-directional ESI," Rev. 2.6, Nov. 19, 1999. An Enclosure Services Interface (ESI) bus 120 is provided to facilitate position and SES data to be passed between the EMU 130 and the GUI host 30, 40. Preferably, the ESI bus 120 functions to allow the EMU 130 to provide enclosure position and SES data signals without occupying an address on the fibre channel loop 108 (although in some embodiments the EMU 130 may be directly linked to the host 30, 40).

As shown, the enclosure 100 includes an EMU 130 that primarily functions to process and broadcast SES data to either the GUI host 30, 40 and/or the cabinet EMU 86, 88. Significantly, the EMU 130 also functions to process and forward passive shelf identifier information and cabinet identifier information from the cabinet bus 60, 62. To this end, the EMU 130 includes an ESI controller 132, an EMU processor or CPU 134 (linked via I/O latch 158 to the cabinet bus 60, 62), and a controller area network (CAN) bus controller 156. Memory is provided for use by the CPU 134, and may take many forms such as that illustrated of RAM 138 (such as 256 K), flash memory 140 (such as 512 K), and EEPROM 142 (such as 2 K). FIG. 2 illustrates the cabinet cable or bus 60, 62 connected to the CAN bus controller 156 to allow the EMU 130 to obtain the shelf identifier signal and obtain CAN signals. In other embodiments not shown, the EMU 130 or other enclosure processor may obtain the shelf identifier or number from other wires on the cabinet bus 60, 62 connected to other components of the EMU 130 of the enclosure 100.

The EMU 130 further includes memory 144 in the form of ¼ K EEPROM that is typical of many printed circuit assemblies and may be used by the EMU 130 for storage of type and revision information, worldwide names, serial numbers, and similar information. LED controls 146 and an input and output display 148 are provided for operation by the EMU CPU 134. An I2C controller 150 and temperature sensor 152 are provided and linked to the I2C bus 160 which provides a communication path for the EMU 130 to receive status information from and to send control information to all of the elements of the enclosure 100. The enclosure 100 further includes I/O module 104, memory 162 and backplane memory 164 linked to the I2C bus 160. Redundant power supplies 166, 168 are also provided and linked to the I2C bus 160. A LCD panel 170 for the enclosure 100 may also be provided and linked (by a RJ-45 connector or otherwise) to the I2C bus 160 for receiving control signals from the EMU 130.

According to an important aspect of the invention, the enclosure 100 passively receives electrical signals that it uses to determine a unique digital identifier for the shelf 24, 54 upon which the enclosure is positioned. This is achieved with the use of the cabinet bus 60, 62 that includes a series of junction boxes 66, 68 that each provide a unique shelf identifier for a set of shelves 24, 54 (such as for 2 shelves). The cabinet bus 60, 62 is comprised, in part, of wires that are divided into sensing sets or groups that work in combination to provide a single position signal that identifies the shelf 24, 54 (e.g., vertical position within the cabinet 20, 50). Two sensing sets are used along with alternate grounding and wire crossover between junction boxes 66, 68 to provide the passive signaling of shelf identifiers. Depending on the number of shelves 24, 54 to be identified in a cabinet 20, 50, numerous combinations of numbers of wires in each sensing set may be used such as sets of 5 and 2, 4 and 3, and the like.

Figure 3:
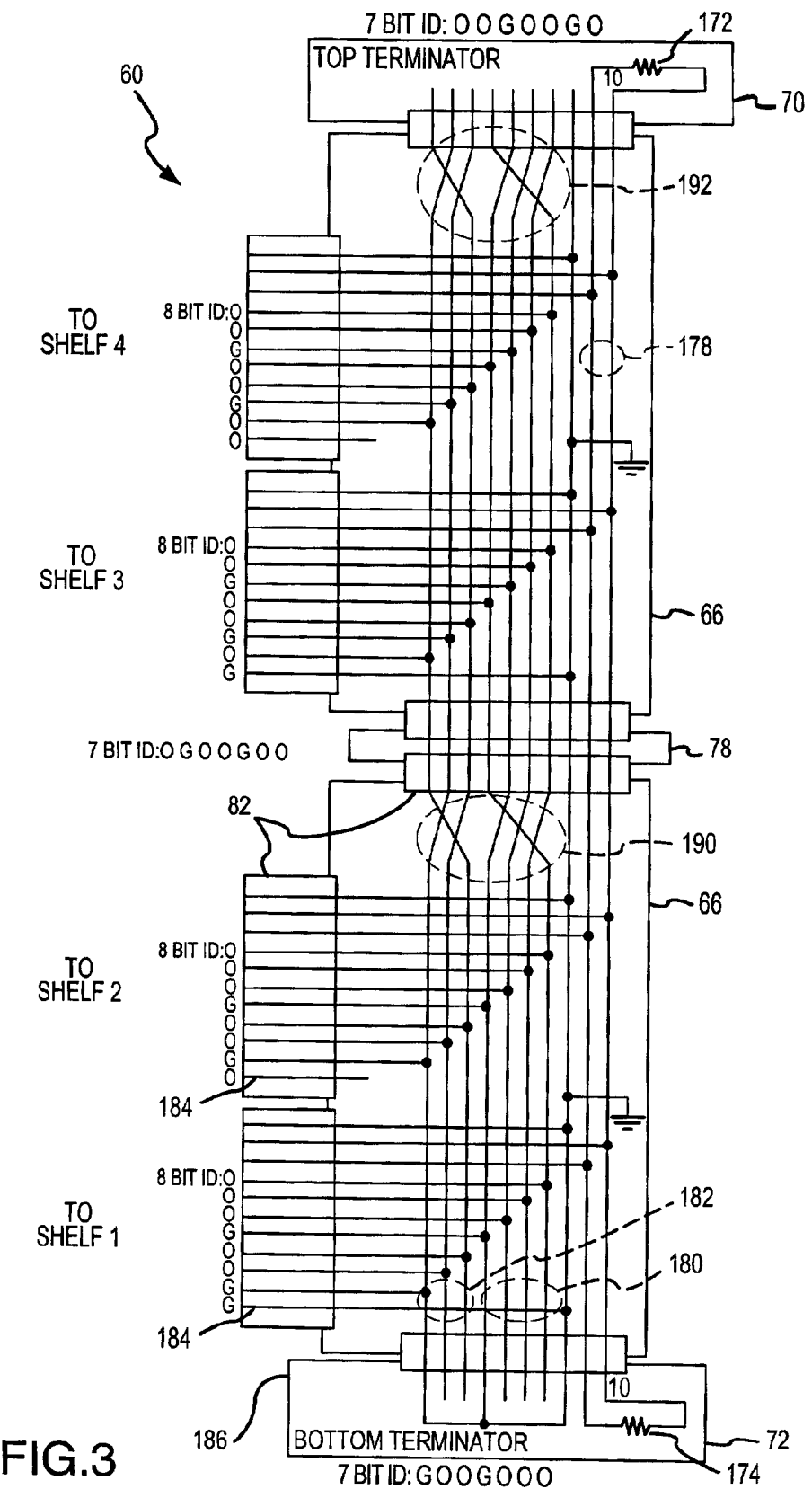
FIG. 3 is a wiring diagram of a portion of a cabinet cable illustrating the 3–4 wiring arrangement used in one embodiment of the invention to provide unique digital identifiers to each shelf location in a cabinet.

FIG. 3 shows one preferred embodiment of a cabinet bus 60 that provides 24 unique shelf identifiers (as shown in tabular form in FIG. 4). A small portion of the cabinet bus 60 is provided illustrating only two junction boxes 66 although the number of junction boxes 66 typically will range between 7 and 12 for most cabinets 20, 50 to identify between 14 and 24 shelves 24, 54. The cabinet bus 60 has two main purposes: provide an identifier for an enclosure 100 location within the cabinet 20, 50 (such as vertical position in distances in units of 3U from the bottom of the cabinet 20, 50 and cabinet designation or identifier) and provide a communications path between the device enclosure EMUs 130 in the cabinet 20, 50 that does not conflict or compete with the data path 108 to drives 116 within the enclosures 100. The combination of the shelf location and cabinet designation provides complete enclosure position information that allows complete mapping or visualization of every enclosure 100 on shelves 24, 54 in the data storage system 10.

In the embodiment illustrated in FIG. 3, a ten-wire arrangement for the cabinet bus 60 is shown with seven wires being dedicated to passively providing the shelf location to the side connectors 82 in which enclosure 100 is connected (such as to EMU 130 via CAN bus controller 156). As shown, two wires are used for a CAN bus 178 and the remaining wire is used as a ground for the cabinet bus 60. The "horizontal" portion of the cabinet bus 60 is a stub that taps off the "vertical" portion at a specific location for a single shelf 24, 54.

More specifically, the cabinet bus 60 is fabricated of modular pieces called junction boxes 66. Each junction box has four connectors 82, 84, such as RJ-45 connectors. Two connectors 82 (side or transverse connectors) are stubs that connect to two shelves 24, 54 (as shown with connectors 82, 84 to shelf 1 and shelf 2 for one junction box 66 and to shelf 3 and 4 for the second junction box 66). The other two connectors 82, 84 (end or inline connectors) function to enable the junction boxes 66 to be daisy chained to adjacent junction boxes 66 with an inter-junction cable 78, 80. In a typical cabinet 20, 50, each junction box 66 serves 2 shelves (or 6U of height in a 3U spacing arrangement) within the cabinet 20, 50. To facilitate operation of the CAN bus 178, terminating resistors 172, 174 (such as 120 ohm resistors) are provided at each end of the active bus 178. In one embodiment, the terminating resistors 172, 174 are contained in terminating plugs 70, 72 attached to the top and bottom junction boxes 66 in the cabinet bus 60.

The cabinet bus 60 includes a first and second sensing group of wires 180, 182 and a selectively grounded wire 184 that are dedicated to providing shelf identifier or position information to the side connectors 82 (and, connected enclosures 100). As shown, the first and second groups 180, 182 include a total of seven wires with the first group 180 including 4 wires and the second group 182 including 3 wires. At the bottom terminator 174 (in the bottom of the cabinet 20, 50), one wire from each group 180, 182 is grounded and the remaining wires in each group 180, 182 are left open or ungrounded. The signals from each wire in the groups 180, 182 are pulled up (and then combined and processed) in each EMU 130 in the shelves 24, 54 via the side connectors 82. The illustrated embodiment of cabinet bus 60 shows the starting bits (i.e., 7-bit initial ID) of an identifier signal being "OOGOOOG" (for open (O) or a 1 bit and ground (G) or a 0 bit) when the two sensing groups 180, 182 signals are combined sequentially (group 182 followed by group 180).

An eighth sense wire 184 is provided and added to the horizontal stub for each shelf 24, 54 in each junction box 66 (as shown, twice for each box 66). The additional sense wire 184 provides a binary value (or final bit) that is alternately grounded within each junction box 66 to provide a unique shelf identifier (ID) for each shelf 24, 54 within a box 66. As shown, the sense wire 184 is grounded on the first portion of the junction box 66 at 186 prior to tying to the side connector 82 but left open in the second portion of the junction box 66 prior to tying to the second side connector 82. In this example, the first shelf position identifier is the 8-bit ID of "OOOGOOGG" when the first and second sensing groups 180 and 182 are combined with the additional sense wire 184. The second shelf position identifier is differentiated by leaving the sensing wire 184 ungrounded and becomes the 8-bit ID of "OOOGOOGO." In this manner, the passive position sensing method of the present invention is able to uniquely identify each shelf 24, 54 in each junction box 66 although the same signal originates (from the starting 7-bit identifier) in the combination of the two sensing groups 180, 182.

To provide a unique identifier (e.g., 7-bit identifier) to each junction box 66, the passive numbering scheme utilizes numbers of wires for groups 180, 182 that are relatively prime, such as 3 and 4 in the illustrated embodiment. Significantly, the lines within each group 180, 182 are rotated or crossed-over as shown at 190 and 192 after the final side connector and at least before the next connection to the next junction box 66. In other words, each wire in each sensing group 180, 182 is moved one position within the group 180, 182 to present a new position code to the next junction box 66 along the cabinet bus 60 (including a last position to a first position). For example, as shown, the rotation or "next position" moving of the wires in the groups at 190 causes the initial position identifier signal to change from "GOOGOOO" to "OGOOGOO" and at 192 to change from "OGOOGOO" to "OOGOOGO."

In operation, the shelf ID is determined from the combined signals of the eight lines (TTL or other lines) of the first and second sensing groups 180, 182 and the additional sensing line 184 from the cabinet bus 60. The use of groupings of 3 and 4 lines (sets 182, 180) combined with an alternately grounded eighth line 184 provides 24 unique identifiers as shown in the table of FIG. 4. FIG. 4 further shows how for each segment of cable 60 corresponding to a junction box 66 the single binary bit of the alternating grounded wire 184 provides two unique shelf IDs. The larger cabinets 20, 50 generally have heights of less than about 42U, and each storage shelf 24, 54 occupies 3U with a pair of controller shelves/enclosures occupying another 3U of the cabinet height. Hence, typical cabinets 20, 50 contain 14 or less shelves 24, 54 and the 24 shelf IDs provided by the illustrated example is more than adequate.

In one embodiment, a shelf ID of "0" is reserved to indicate the actual shelf position cannot be determined. Shelf IDs of 1 to 14 shown in FIG. 4 are used for shelves 24, 54 used for device enclosures 100 and indicate the height the shelf 24, 54 is from the bottom of the cabinet 20, 50. Shelf ID of "63" is reserved for a cabinet EMU with the other shelf IDs being reserved for expansion. As shown in the table of FIG. 4, the position signal provided by the cable 60 can also indicate a cabinet cable 60 is disconnected which occurs whenever every wire in either of the sensing groups 180, 182 is left open or ungrounded.

The enclosure 130 with the CPU 134 can process the received shelf ID signal from the side connector 82 to quickly look up or otherwise determine the shelf ID (which is typically a number of distance unit, such as 3Us, from the bottom of the cabinet 20, 50) and convert this to a four bit shelf ID (i.e., representing shelf IDs of 1 to 14). The cabinet identifier information, such as a cabinet number, from the cabinet EMU 86, 88, is unique number and in some embodiments is a unique 8-bit number. In operation, the EMU 130 operates to transmit the shelf ID and cabinet number in each message, such as in the message header, to allow the receiving device (e.g., the monitoring GUI host 30, 40 or another enclosure 100 in another cabinet 20, 50) to quickly identify and/or map the physical location of the enclosure 100 within the data storage system 10 by shelf 24, 54 and cabinet 20, 50. Of course, if no message is received from an EMU 130, the enclosure 100 is not present or in other words, if a shelf ID and cabinet number combination is not reported to the GUI host 30, 40 then that location would be considered open or available.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. For example, the specific number of unique shelf identifiers provided by the cabinet bus 60 can readily be varied by changing the number of wires in each sensing group 180, 182 and even the number of sensing groups 180, 182. Additionally, the use of more than one alternatively grounded sense wire 184 would allow the number of unique identifiers for shelves to be increased. With the features of the passive position sensing method taught in this disclosure, those skilled in the art will be able to readily arrive at cabinet bus 60 configurations that provide unique shelf IDs for numerous shelves 24, 54 within a cabinet 20, 50, and these arrangements are considered to be fully within the breadth of this disclosure and the following claims.

FIG. 5 provides another specific illustration of how the teaching of the invention can be readily expanded to other than 3U shelf-spacing arrangements. The table in FIG. 5 illustrates shelf IDs that can be obtained to support a 1U shelf-spacing arrangement. As shown, one or two bits are grounded in each wiring group (such as groups 180 and 182) rather than just one as shown in FIG. 3 with the other lines being left open in the bus 60, 62. The illustrated passive identifier scheme supports positioning or spacing of 1U within a cabinet having 48 or less shelves. Presently, the largest cabinets are 42U in height which can readily be supported by this alternative passive wiring scheme for cabinet bus 60, 62, but those skilled in the art will readily comprehend that the features of the 1U and 3U spacing embodiments can be applied to smaller and larger cabinets with the same or differing shelf spacing by varying the crossover techniques, by utilizing fewer or greater sense wires or groups of sense wires, and by using varied grounding schemes.

We claim:

1. A position sensing apparatus for use in a data storage cabinet having multiple shelves for receiving device enclosures, comprising:
   a first junction box having an output connection at a first shelf of the cabinet for generating and providing a first shelf identifier signal to a device enclosure connected to the first shelf; and
   a second junction box linked to the first junction box for receiving an output signal and having an output connection at a second shelf of the cabinet for generating and providing a second shelf identifier signal to a device enclosure connected to the second shelf, wherein the second shelf identifier signal differs from the first shelf identifier signal.

2. The apparatus of claim 1, wherein the first and second junction boxes each include an additional output connection at third and fourth shelves of the cabinet for providing third and fourth shelf identifier signals differing from the first and second shelf identifier signals, respectively.

3. The apparatus of claim 2, wherein each of the junction boxes includes a sensing wire providing signals to the output connections and being alternately grounded and open to differentiate the first and second shelf identifier signals from the third and fourth shelf identifier signals.

4. The apparatus of claim 1, wherein the junction boxes include a first and a second set of sensing wires each providing a number of bit signals that are included in the shelf identifier signals to the output connections.

5. The apparatus of claim 4, wherein the number of signals is based on the number of wires in each of the sets and wherein the number of wires in the first set differs from the number in the second set.

6. The apparatus of claim 5, wherein the number of wires in the first set is three and the number of wires in the second set is four.

7. The apparatus of claim 4, wherein the sensing wires of the first and second sets are passed through the first junction box and are included in the output signal to the second junction box and further wherein each of the sensing wires in the first set are moved one position within the first set and each of the sensing wires in the second set are moved one position within the second set prior to the link with the second junction box.

8. The apparatus of claim 7, wherein the first junction box and the second junction box are substantially identical and interchangeable.

9. The apparatus of claim 7, further including a cabinet area network bus having terminating resistors at each end.

10. A cabinet for physically storing and communicatively linking computing devices, comprising:
    a plurality of shelves adapted for receiving device enclosures;
    a cabinet bus linked to each of the shelves and adapted to provide a unique shelf identifier signal to each of the shelves; and
    means for providing information identifying the cabinet to each of the shelves.

11. The cabinet of claim 10, further including a device enclosure on one of the shelves comprising a processor for processing the unique shelf identifier to determine a physical location within the cabinet.

12. The cabinet of claim 11, wherein the processor includes the determined physical location and the cabinet identification information in messages transmitted outside the enclosure.

13. The cabinet of claim 11, wherein the processor determines the physical location by retrieving a shelf identifier from memory using the received shelf identifier signal.

14. The cabinet of claim 13, wherein the received shelf identifier signal is an 8-bit signal.

15. The cabinet of claim 10, wherein the cabinet bus comprises a plurality of serially connected junction boxes each including a first set of sensing wires and a second set of sensing wires and a side connector linked to one of the shelves for providing the shelf identifier signal from the first and second sets of sensing wires.

16. The cabinet of claim 15, wherein each of the sensing wires in the first set are moved one position and each of the sensing wires in the second set are moved one position prior to the connection to an adjacent junction box to provide an output signal to modify the shelf identifier signal in each consecutive junction box in the cabinet bus.

17. The cabinet of claim 16, wherein each junction box further includes an additional side connector linked to the first and second sets of sensing wires and an additional sensing wire that is linked to the side connectors and is alternately grounded and ungrounded at each side connector to provide differing ones of the shelf identifier signals within each junction box.

18. The cabinet of claim 17, wherein the first set includes 3 of the sensing wires and the second set includes 4 of the sensing wires to provide at least 24 of the unique shelf identifier signals within the cabinet bus.

19. A data storage system with passive position determination of enclosures, comprising:
    a plurality of cabinets each having a plurality of shelves for receiving and linking computing devices, a cabinet bus linked to the shelves for generating and providing a shelf identifier to each shelf, and a device for providing a cabinet identifier to each shelf;
    a device enclosure positioned on one of the shelves in one of the cabinets and linked to the cabinet bus in the one cabinet, wherein the device enclosure receives the shelf identifier for the one shelf and the cabinet identifier for the one cabinet and creates and transmits a physical location message; and
    a host linked to the one cabinet receiving the physical location message and outputting a physical location of the device enclosure including the one shelf and the one cabinet.

20. The system of claim 19, wherein the cabinet bus includes a plurality of junction boxes comprising a first and second set of sensing wires linked to the shelves and carrying the shelf identifier, the sensing wires of the first set rotating one position within the first set prior to connection to the next one of the junction boxes and the sensing wires of the second set rotating one position within the second set prior to connection to the next one of the junction boxes, whereby the shelf identifier output to the next one of the junction boxes is modified.

21. The system of claim 20, wherein each of the junction boxes is connected to two shelves and the cabinet bus further includes an additional sensing line that is grounded prior to a first one of the two shelves and is ungrounded prior to a second one of the two shelves.

* * * * *

UNITED STATES PATENT AND TRADEMARK OFFICE
CERTIFICATE OF CORRECTION

| | | |
|---|---|---|
| PATENT NO. | : 6,912,599 B2 | Page 1 of 1 |
| APPLICATION NO. | : 10/038231 | |
| DATED | : June 28, 2005 | |
| INVENTOR(S) | : Stephen J. Sicola et al. | |

It is certified that error appears in the above-identified patent and that said Letters Patent is hereby corrected as shown below:

In column 9, line 51, in Claim 8, after "box are" delete "substantially identical and".

In column 9, line 59, in Claim 10, after "adapted to" insert -- generate and --.

Signed and Sealed this

Thirteenth Day of July, 2010

David J. Kappos
*Director of the United States Patent and Trademark Office*